(12) United States Patent
Yershov et al.

(10) Patent No.: US 9,483,236 B2
(45) Date of Patent: Nov. 1, 2016

(54) EFFICIENTLY REPRESENTING COMPLEX SCORE MODELS

(71) Applicant: Fair Isaac Corporation, San Jose, CA (US)

(72) Inventors: Andrei R. Yershov, Cupertino, CA (US); Andrew K. Holland, Palo Alto, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 61 days.

(21) Appl. No.: 14/250,918

(22) Filed: Apr. 11, 2014

(65) Prior Publication Data

US 2015/0293750 A1    Oct. 15, 2015

(51) Int. Cl.
*G06F 9/44* (2006.01)
*G06F 9/45* (2006.01)

(52) U.S. Cl.
CPC ............... *G06F 8/315* (2013.01); *G06F 8/31* (2013.01); *G06F 8/40* (2013.01); *G06F 8/51* (2013.01)

(58) Field of Classification Search
None
See application file for complete search history.

(56) References Cited

U.S. PATENT DOCUMENTS

| | | | | |
|---|---|---|---|---|
| 7,093,231 B2 * | 8/2006 | Nuss | ............... | G06F 8/31 707/999.006 |
| 7,543,015 B2 * | 6/2009 | Vion-Dury | ............ | G06F 8/31 707/999.006 |
| 9,152,387 B2 * | 10/2015 | Jesurum | ............. | G06F 8/315 |
| 2004/0015812 A1 * | 1/2004 | Sreedhar | ............. | G06F 8/315 717/100 |
| 2005/0177817 A1 * | 8/2005 | Arcaro | ............. | G06F 8/40 717/108 |
| 2005/0257193 A1 * | 11/2005 | Falk | ............. | G06F 8/315 717/109 |
| 2006/0106626 A1 * | 5/2006 | Jeng | ............. | G06Q 10/06 717/106 |
| 2009/0058859 A1 * | 3/2009 | Crawford | ............. | G06F 8/34 345/440 |
| 2009/0064053 A1 * | 3/2009 | Crawford | ............. | G06T 11/206 715/854 |
| 2010/0125833 A1 * | 5/2010 | Matic | ............. | G06F 8/75 717/125 |
| 2010/0153923 A1 * | 6/2010 | Kawahito | ............. | G06F 8/40 717/124 |
| 2010/0223591 A1 * | 9/2010 | Shi | ............. | G06F 9/5038 717/102 |
| 2011/0047415 A1 * | 2/2011 | Nanjundaswamy | | G06F 11/3636 714/37 |
| 2011/0258579 A1 * | 10/2011 | Nanjundaswamy | .. | G06F 11/362 715/810 |
| 2012/0317589 A1 * | 12/2012 | Foti | ............. | G06F 8/315 719/320 |
| 2014/0344778 A1 * | 11/2014 | Lau | ............. | G06F 8/35 717/106 |

OTHER PUBLICATIONS

Hauser et al., "Compiling Process Graphs into Executable Code," 2004, Generative Programming and Component Engineering, vol. 3286 of the series Lecture Notes in Computer Science, pp. 317-336.*

(Continued)

*Primary Examiner* — Thuy Dao
*Assistant Examiner* — Stephen Berman
(74) *Attorney, Agent, or Firm* — Mintz Levin Cohn Ferris Glovsky and Popeo, P.C.

(57) ABSTRACT

Data is received that characterizes a score model. Thereafter, the score model is normalized by transforming it into a directed acyclic graph. The directed acyclic graph is then transformed into a structured rules language program. The structured rules language program is then transformed into a program using a concurrent, class-based, object-oriented computer programming language (e.g., JAVA, C, COBOL, etc.). Related apparatus, systems, techniques and articles are also described.

20 Claims, 3 Drawing Sheets

(56) References Cited

OTHER PUBLICATIONS

Koehler et al., "Untangling Unstructured Cyclic Flows—A Solution Based on Continuations," 2004, On the Move to Meaningful Internet Systems 2004: CoopIS, DOA, and ODBASE, vol. 3290 of the series Lecture Notes in Computer Science, pp. 121-138.*

Ammarguellat, "A control-flow normalization algorithm and its complexity," 2002, IEEE Transactions on Software Engineering, vol. 18, Issue 3, pp. 237-251.*

* cited by examiner

EFFICIENTLY REPRESENTING COMPLEX SCORE MODELS

TECHNICAL FIELD

The subject matter described herein relates to finding an efficient representation to evaluate complex score models.

BACKGROUND

A score model is a set of characteristics which can comprise three column tables of bins, bin ranges and score values. Each characteristic is associated with a specific variable used in bin ranges. Bin is a symbolic name. Range is a bounded single dimensional interval of values. Scores are numbers that are associated with a particular bin. Depending on the decision process being modeled a score model can be extremely complex having many characteristics and many bins per an individual characteristic.

Interpretation of a score model implies application of the condition of each range against the value of the decision variable. The simplest interpreter does such comparisons one by one, repeating evaluation for all ranges in a characteristic. A straightforward evaluator would exhaustively evaluate all bins in each characteristic, so it will take C*B evaluations in worst case scenario, where C is the number of characteristics in a score model, B is the average number of bins in a characteristic.

SUMMARY

In one aspect, data is received that characterizes a score model. Thereafter, the score model is normalized by transforming it into a directed acyclic graph. The directed acyclic graph is then transformed into a structured rules language program. The structured rules language program is then transformed into a program using a concurrent, class-based, object-oriented computer programming language (e.g., JAVA, C, COBOL, etc.).

At least a portion of the concurrent, class-based, object-oriented computer programming language can be displayed in a graphical user interface. The concurrent, class-based, object-oriented computer programming language can be the JAVA, C, and/or COBOL programming language.

Normalizing can include mapping the score model to a root node of the directed acyclic graph, mapping characteristics of the score model to intermediate nodes of the directed acyclic graph, and mapping each score value to a leaf node of the directed acyclic graph. In addition, bins of a same characteristic can be sorted and checked for gaps and overlaps between bin ranges. Data reporting overlaps between bin ranges can be transmitted and/or displayed. The normalizing can include merging paths of the directed acyclic graph terminating with equivalent leaf nodes.

Transforming the directed acyclic graph into the structured rules language program can include traversing the directed acyclic graph in a depth-first direction and applying blocks of structured rules language code generated with data from nodes, arcs and leaves of the directed acyclic graph. Transforming the directed acyclic graph into the structured rules language program further can include analyzing the directed acyclic graph to determine a structured rules language generation strategy, and parameterizing a structured rules language generation synthesizer with the determined structured rules language generation strategy. Transforming the structure rules language program into the program using the concurrent, class-based, object-oriented computer programming language can include translating structured rule language rulesets into methods of the concurrent, class-based, object-oriented computer programming language.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides enhanced representations of score models thereby increasing usability to modelers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced organization of rules that enables rules to be efficiently evaluated thereby eliminating redundant evaluations and making optimal transformations of those rules into a code executable on a computer platform. In a process of transformation, rules can be translated into the structured rule language (SRL) program and then to a JAVA, C, or COBOL program.

A directed acyclic graph (DAG) is a Directed Graph with no cycles or loops. A Directed Graph is a set of nodes and a set of directed edges, also known as links or arcs, connecting the nodes. The arcs have arrows indicating directionality of the arc.

Figure 1:
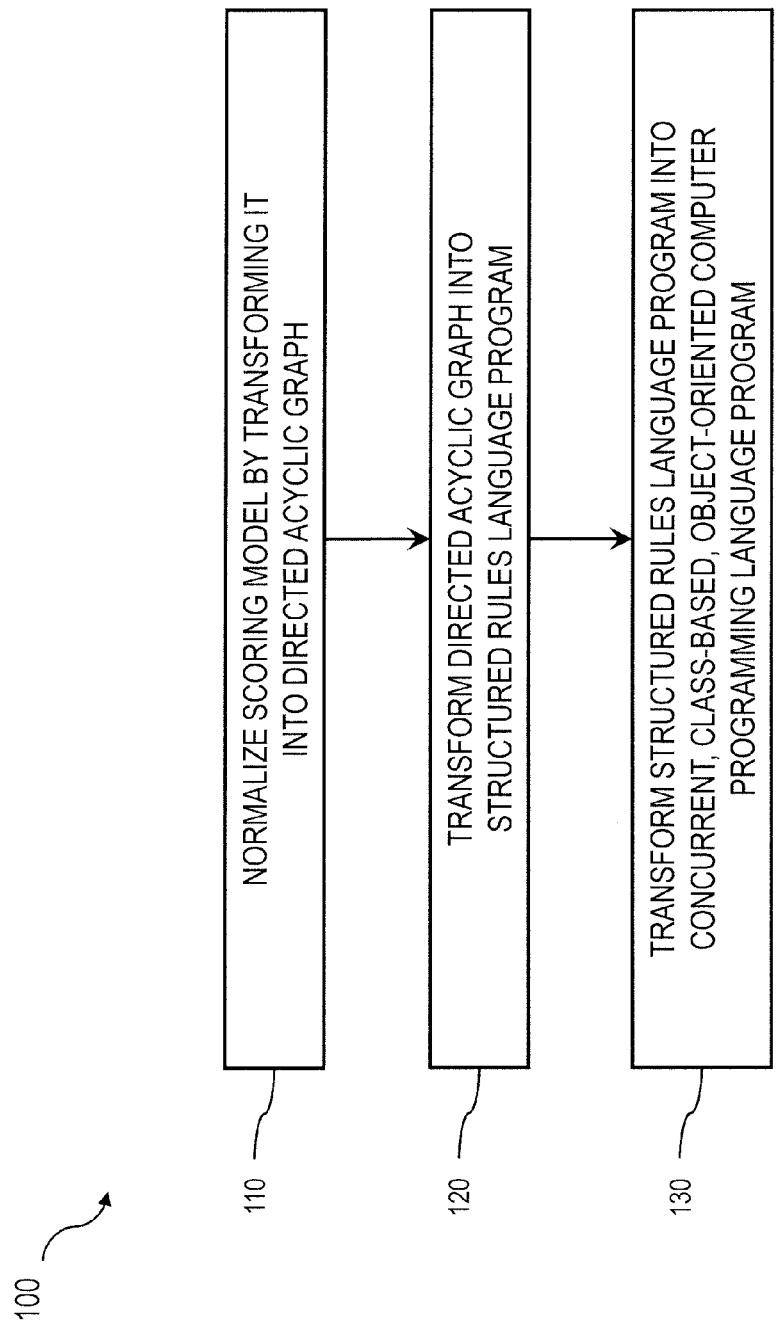
FIG. 1 is a process flow diagram illustrating a technique for representing a scoring model.
Figure 2:
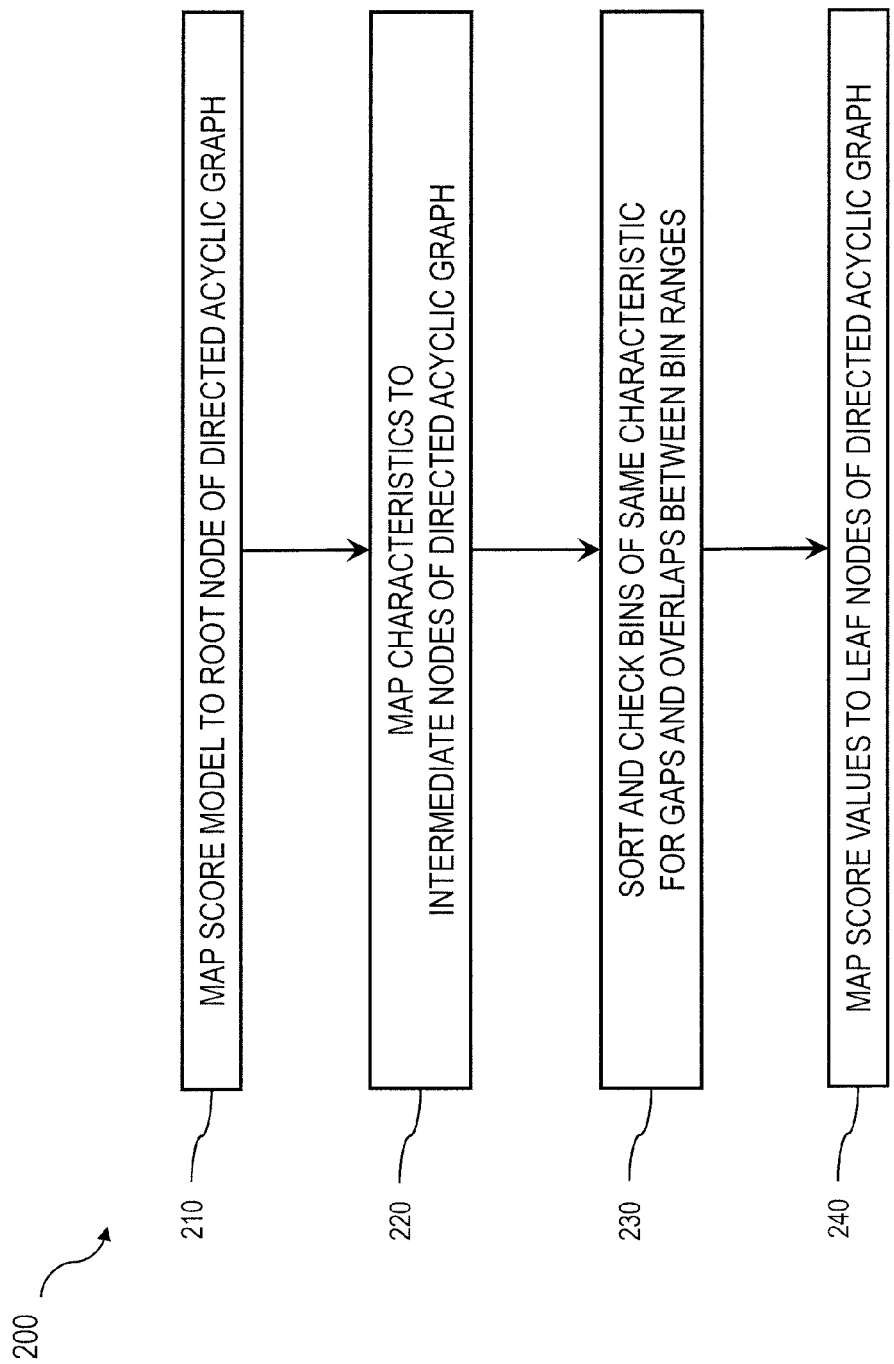
FIG. 2 is a diagram illustrating normalizing a scoring model by transforming it into a directed acyclic graph.

With reference to diagram 100 of FIG. 1 (and as will be described in further detail below), at 110, a score model can be normalized by transforming it into a DAG. Thereafter, at 120, the DAG can be transformed into an SRL program. Later, at 130, the SRL program can be transformed into a concurrent, class-based, object-oriented computer programming language program such as a JAVA, C, or COBOL program.

Normalization of a Score Model. Every score model needs to be converted into the uniform representation which simplifies the following SRL generation as it allows use of a parameterized DAG→SRL translator (as described in further detail below). The normalized form of a score model can be represented by a DAG built from nodes and arcs in such way that the characteristics and bins of a score model can be reflected into nodes of the DAG and score values can be reflected into leaf nodes of the DAG.

With reference to diagram 200, normalization of a score model can initiated, at 210, by mapping the score model to a root node of a DAG. Thereafter, at 220, each characteristic can be mapped to an intermediate node of the DAG connected to the root node. Next, at 230, all bins of the same characteristic can be sorted and checked for gaps and overlaps between bin ranges. All gaps can be associated with the default bin. All overlaps can be treated as errors and reported back to the user. Array of sorted ranges can be converted into the tree of DAG nodes, such that each upper level node has one or two connected nodes of lower level. Subsequently, at 240, each score value can be mapped to a leaf node of DAG. Paths of the DAG terminating with the equivalent leaf nodes can be merged. Two leaf nodes are equivalent if and only if they are mapped to the same score values.

SRL Synthesis. A parameterized SRL synthesizer (as described in further detail) can traverse the DAG generated from a score model. The synthesizer can also analyze the DAG and use information from the score model in order to select the optimal generation strategy. The SRL generation strategy can be represented by a map of DAG entities (nodes and arcs) to SRL code templates. The SRL synthesizer can include a DAG traverser parameterized by a strategy. The SRL synthesizer can take a normalized DAG and traverse it in depth-first direction, applying relevant blocks of SRL code generated by substitution of placeholders in SRL templates with actual data from DAG nodes, arcs and leaves.

While the SRL generation strategy is source metaphor-unique, there can be two main groups of strategies. A first group of strategies can generates a single SRL function and second group of strategies can generate SRL rulesets.

The SRL synthesizer can generate SRL according to the following rules described in backward chaining notation:

```
DAG
    ← <strategy>.DAG_begin
      <strategy>.user_defined_elements
      <strategy>.root_node_begin
      DAG_root_node
      <strategy>.root_node_end
      for each (succ_node in node.successors) DAG_node(succ_node)
      <strategy>.DAG_end
DAG_root_node
    ← <strategy>.gen_node_begin
      <strategy>.gen_root_arc
      <strategy>.gen_node_end
DAG_node(node)
    ← DAG_node_pre(node)
    | DAG_node_post(node)
DAG_node_pre(node)
    ← DAG_action_node
    | DAG_condition_node_pre(node)
DAG_action_node (node)
    ← <strategy>.gen_arc_set_begin
      <strategy>.gen_node_begin
      <strategy>.gen_node_header
      <strategy>.gen_node_action
      <strategy>.gen_node_footer
      <strategy>.gen_node_end
      <strategy>.gen_arcset_end
```

```
DAG_condition_node_pre(node)
    ← <strategy>.gen_arc_set_begin
      <strategy>.gen_node_begin
      for each (succ_node in node.successors)
      DAG_node(succ_node)
      <strategy>.gen_node_end
      <strategy>.gen_arcset_end
DAG_node_post(node)
    ← DAG_action_node(node)
    | DAG_condition_node_post(node)
DAG_condition_node_post(node)
    ← <strategy>.gen_arc_set_begin
      <strategy>.gen_arc
      <strategy>.gen_arc_set_end
      for each (succ_node in node.successors)
      DAG_node(succ_node)
```

With the above, DAG traversing goals are in italics with strategy parameter placeholders are in angular brackets.

There can be various approaches to traversing DAGs. A first approach can invoke recursive node traversal after processing all of its outgoing arcs represented by an arc set. A second approach can invoke node traversal inside of arc set generation.

The first DAG traversal approach can be used for strategies that transform nodes to SRL functions or rulesets. Node outgoing arcs can be converted to function call expressions and a node condition can be converted to a Boolean expression. This approach can be used for large score models. The approach can apply the DAG_condition_node_post rule.

The second DAG traversal approach can be used by the strategy which generates recursively nested IF-ELSE conditions inside of the same functional (i.e., SRL function, SRL ruleset, etc.). This approach can be applicable for small and medium score models. The approach can apply the DAG_condition_node_pre rule.

To optimize a number of generated JAVA classes, some generated functionals can be inlined. Two or more generated SRL functionals can be merged into a single large JAVA class in such way that all context variables will be shared between all merged methods. Looking from perspective of the source DAG, the DAG can be partitioned into the set of connected sub DAGs; exactly one implementation JAVA class can be generated for each sub DAG contained in a partition. The DAG can be partitioned in direction of depth first traversal, so DAG nodes from the same path (lower levels take the priority) will have higher probability to be in the same partition which optimizes class loading expenses.

Figure 3:
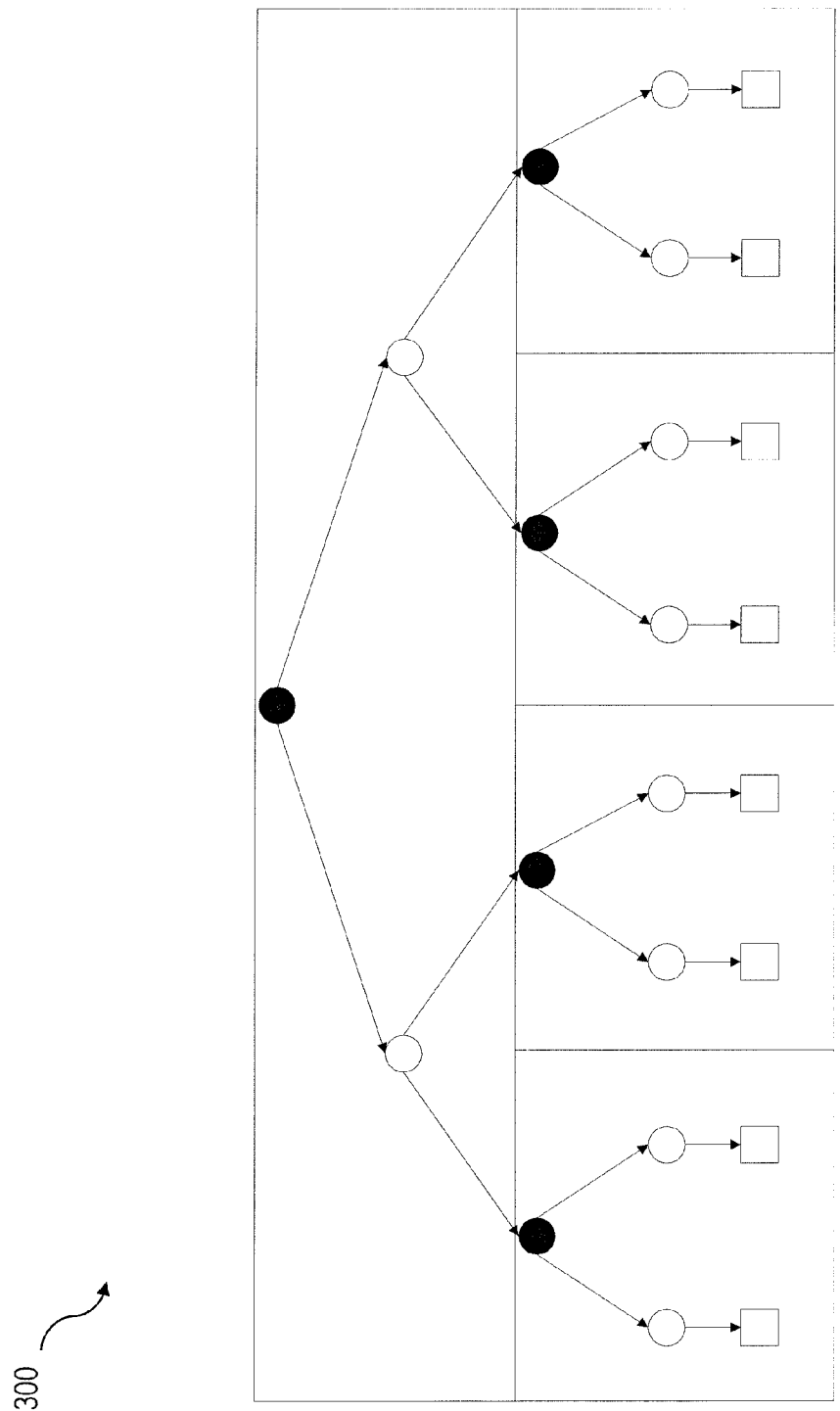
FIG. 3 is a diagram illustrating partitioning of a directed acyclic graph corresponding to a scoring model.

FIG. 3 is a diagram 300 illustrating a DAG partitioned to five disjoint partitions (it will be appreciated the number of nodes in a partition of a DAG can vary based on space and time constraints). With this example, a first node in a partition (solid black) is not inlined, which in addition to a test condition, can require generation of DAG context variables initialization statements, local pattern declaration statements and user defined SRL rules. All subsequent (solid white) nodes and actions can be inlined so only the test condition and (or) action are generated.

JAVA Generation. The JAVA generator can translate SRL rulesets to methods of JAVA classes in such way that every rule is translated into a method of JAVA class or into a statement of JAVA method. SRL, synthesized by the SRL generator, can be built from a list of SRL rulesets or SRL functions. Each ruleset can be translated to one or more classes of a target JAVA program. The number of generated classes might become a limiting factor both in size of generated program and in speed of execution. Size constraints come from the fact that extra content needs to be generated for every class. Execution time can be affected by the time needed for instantiation a JAVA object in memory, passing method arguments and generating context for a method, if the deployment platform is JAVA. Execution time can also be affected by the processor's cache defragmentation: the size of a partition can be chosen comparable to the processor's cache memory size which will reduce cache misses during the DAG traversal.

Complexity Analysis. Score model evaluation algorithms can generate rules which evaluate all bins of each characteristic sequentially. Such algorithms can be represented by a flat ruleset which contains all characteristics, with one rule per bin. Such algorithms can also contain a default rule which assigns the default values for all characteristics before the evaluation. So the estimated average case time complexity in big O notation is:

$$O=(2*Nc*A+Nc*Nb=Nc(2*A+Nb)),$$

where
A is the cost of a characteristic assignment;
Nc is the number of characteristics and
Nb is the average number of bins per characteristic.
Here a number of actions is multiplied by two because of an initial rule which causes double assignment of each characteristic in a model.

Time complexity of a DAG evaluation algorithm can be as follows:

$$O=Nc(A+\log Nb))$$

It should be noted that this complexity calculation does not include the actual implementation costs like the ruleset initialization or function calls.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
receiving data characterizing a score model;
normalizing the score model by transforming it into a directed acyclic graph comprising a plurality of nodes;
a first method comprising:
converting a node outgoing arc into a function call expression, the node outgoing arc connecting the plurality of nodes of the directed acyclic graph; and
converting a node condition into a Boolean expression;
a second method comprising:
recursively generating nested IF-ELSE conditions inside of a single structured rules language function;
transforming the directed acyclic graph into a structured rules language program, the transforming of the directed acyclic graph into the structured rules language program comprising at least one of the first method and the second method;
transforming the structured rules language program into a program using a concurrent, class-based, object-oriented computer programming language; and executing the program with the at least one computing system.

2. A method as in claim 1 further comprising:
displaying at least a portion of the concurrent, class-based, object-oriented computer programming language in a graphical user interface.

3. A method as in claim 1, wherein the concurrent, class-based, object-oriented computer programming language is selected from a group consisting of: JAVA programming language, C programming language, and COBOL programming language.

4. A method as in claim 1, wherein the normalizing comprises:
mapping the score model to a root node of the directed acyclic graph;
mapping characteristics of the score model to intermediate nodes of the directed acyclic graph;
wherein the score model comprises at least one score value; and
mapping each of the at least one score value to a leaf node of the directed acyclic graph.

5. A method as in claim 4, wherein the normalizing further comprises:
sorting bins of a same characteristic and checking for gaps and overlaps between bin ranges.

6. A method as in claim 5, further comprising:
transmitting or displaying data reporting overlaps between bin ranges.

7. A method as in claim 4, wherein the normalizing further comprises:
merging paths of the directed acyclic graph terminating with equivalent leaf nodes.

8. A method as in claim 1, wherein transforming the directed acyclic graph into the structured rules language program comprises:
traversing the directed acyclic graph in a depth-first direction and applying blocks of structured rules language code generated with data from nodes, arcs and leaves of the directed acyclic graph.

9. A method as in claim 8, wherein transforming the directed acyclic graph into the structured rules language program further comprises:
analyzing the directed acyclic graph to determine a structured rules language generation strategy; and
parameterizing a structured rules language generation synthesizer with the determined structured rules language generation strategy.

10. A method as in claim 1, wherein transforming the structure rules language program into the program using the concurrent, class-based, object-oriented computer programming language comprises:
translating structured rule language rulesets into methods of the concurrent, class-based, object-oriented computer programming language.

11. A non-transitory computer program product storing instructions which, when executed by at least one data processor forming part of at least one computing system, result in operations:
receiving data characterizing a score model;
normalizing the score model by transforming it into a directed acyclic graph comprising a plurality of nodes;
a first method comprising:
converting a node outgoing arc into a function call expression, the node outgoing arc connecting the plurality of nodes of the directed acyclic graph; and
converting a node condition into a Boolean expression;
a second method comprising:
recursively generating nested IF-ELSE conditions inside of a single structured rules language function;
transforming the directed acyclic graph into a structured rules language program, the transforming of the directed acyclic graph into the structured rules language program comprising at least one of the first method and the second method;
transforming the structured rules language program into a program using a concurrent, class-based, object-oriented computer programming language; and
executing the program with the at least one computing system.

12. A computer program product as in claim 11, wherein the operations further comprise:
displaying at least a portion of the concurrent, class-based, object-oriented computer programming language in a graphical user interface.

13. A computer program product as in claim 11, wherein the concurrent, class-based, object-oriented computer programming language is selected from a group consisting of: JAVA programming language, C programming language, and COBOL programming language.

14. A computer program product as in claim 11, wherein the normalizing comprises:
mapping the score model to a root node of the directed acyclic graph;
mapping characteristics of the score model to intermediate nodes of the directed acyclic graph;
wherein the score model comprises at least one score value; and
mapping each of the at least one score value to a leaf node of the directed acyclic graph.

15. A computer program product as in claim 14, wherein the normalizing further comprises:
sorting bins of a same characteristic and checking for gaps and overlaps between bin ranges.

16. A computer program product as in claim 15, wherein the operations further comprise:
transmitting or displaying data reporting overlaps between bin ranges.

17. A computer program product as in claim 14, wherein the normalizing further comprises:
merging paths of the directed acyclic graph terminating with equivalent leaf nodes.

18. A computer program product as in claim 11, wherein transforming the directed acyclic graph into the structured rules language program comprises:
   traversing the directed acyclic graph in a depth-first direction and applying blocks of structured rules language code generated with data from nodes, arcs and leaves of the directed acyclic graph.

19. A computer program product as in claim 18, wherein transforming the directed acyclic graph into the structured rules language program further comprises:
   analyzing the directed acyclic graph to determine a structured rules language generation strategy; and
   parameterizing a structured rules language generation synthesizer with the determined structured rules language generation strategy.

20. A computer program product as in claim 11, wherein transforming the structure rules language program into the program using the concurrent, class-based, object-oriented computer programming language comprises:
   translating structured rule language rulesets into methods of the concurrent, class-based, object-oriented computer programming language.

\* \* \* \* \*